(12) United States Patent
Cerbo

(10) Patent No.: US 6,544,116 B1
(45) Date of Patent: Apr. 8, 2003

(54) VENTILATION APPARATUS

(76) Inventor: Michael Cerbo, 345 Sandford Ave., Lyndhurst, NJ (US) 07071

( * ) Notice: Subject to any disclaimer, the term of this patent is extended or adjusted under 35 U.S.C. 154(b) by 0 days.

(21) Appl. No.: 10/076,462

(22) Filed: Feb. 15, 2002

(51) Int. Cl.[7] .................................................. B60H 1/24
(52) U.S. Cl. ..................................... 454/162; 62/235.1
(58) Field of Search ................................ 454/162, 163, 454/142, 165; 62/235.1

(56) References Cited

U.S. PATENT DOCUMENTS

| | | | |
|---|---|---|---|
| 2,674,175 A | * 4/1954 | Backe | 237/12.3 A |
| 4,170,880 A | * 10/1979 | Lou | 454/201 |
| 4,628,702 A | 12/1986 | Boxum | |
| 4,741,256 A | 5/1988 | Huang | |
| 5,205,781 A | 4/1993 | Kanno et al. | |
| 5,261,855 A | 11/1993 | Law et al. | |
| 5,261,856 A | * 11/1993 | Walser | 454/139 |
| D365,543 S | 12/1995 | Deary | |
| 5,733,190 A | 3/1998 | Wahab | |
| 6,086,474 A | * 7/2000 | Dohring | 454/143 |

* cited by examiner

Primary Examiner—Derek S. Boles

(57) ABSTRACT

A ventilation apparatus for selectively moving air of an interior of a motor vehicle. The ventilation apparatus includes a main exhaust system for moving interior air from the interior of the vehicle to an exterior of the vehicle. A first area air handling system for moving air between the interior and the exterior of the vehicle in a first area. A second area air handling system for moving air between the interior and the exterior of the vehicle in a second area. A first actuator for controlling the rate of airflow through the main exhaust system, the first area air handling system, and the second area air handling system. A second actuator for switching between a plurality of modes of operation. The main exhaust system is preferably mounted adjacent to the ashtray and operates in an exhaust mode only, while the area systems can be switched to operate between the exhaust mode or in an intake mode.

20 Claims, 4 Drawing Sheets

VENTILATION APPARATUS

BACKGROUND OF THE INVENTION

1. Field of the Invention

The present invention relates to ventilation systems and more particularly pertains to a new ventilation apparatus for selectively moving air of an interior of a motor vehicle.

2. Description of the Prior Art

The use of ventilation systems is known in the prior art. U.S. Pat. No. 5,261,855 describes a smoke removal system for vehicles. Another type of ventilation system is U.S. Pat. No. 5,205,781 which is a preliminary ventilation device for vehicles.

While these devices fulfill their respective, particular objectives and requirements, the need remains for a system that is independently capable of selectively removing unwanted air such as smoke from one area of the vehicle while simultaneously bringing in fresh air to another area.

SUMMARY OF THE INVENTION

The present invention meets the needs presented above by incorporating three separate air systems working in conjunction with vents that are strategically positioned within the vehicle.

An object of the present invention is to provide a new ventilation apparatus that pulls in cigarette smoke and unpleasant odors from the interior of the vehicle and draws it outside.

Another object of the present invention is to provide a new ventilation apparatus that allows for the windows to remain closed during inclement weather.

To this end, the present invention generally comprises a main exhaust system for moving interior air from the interior of the vehicle to an exterior of the vehicle. A first area air handling system for moving air between the interior and the exterior of the vehicle in a first area. A second area air handling system for moving air between the interior and the exterior of the vehicle in a second area. A first actuator for controlling the rate of airflow through the main exhaust system, the first area air handling system, and the second area air handling system. A second actuator for switching between a plurality of modes of operation. The main exhaust system is preferably mounted adjacent to the ashtray and operates in an exhaust mode only, while the area systems can be switched to operate between the exhaust mode or in an intake mode.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
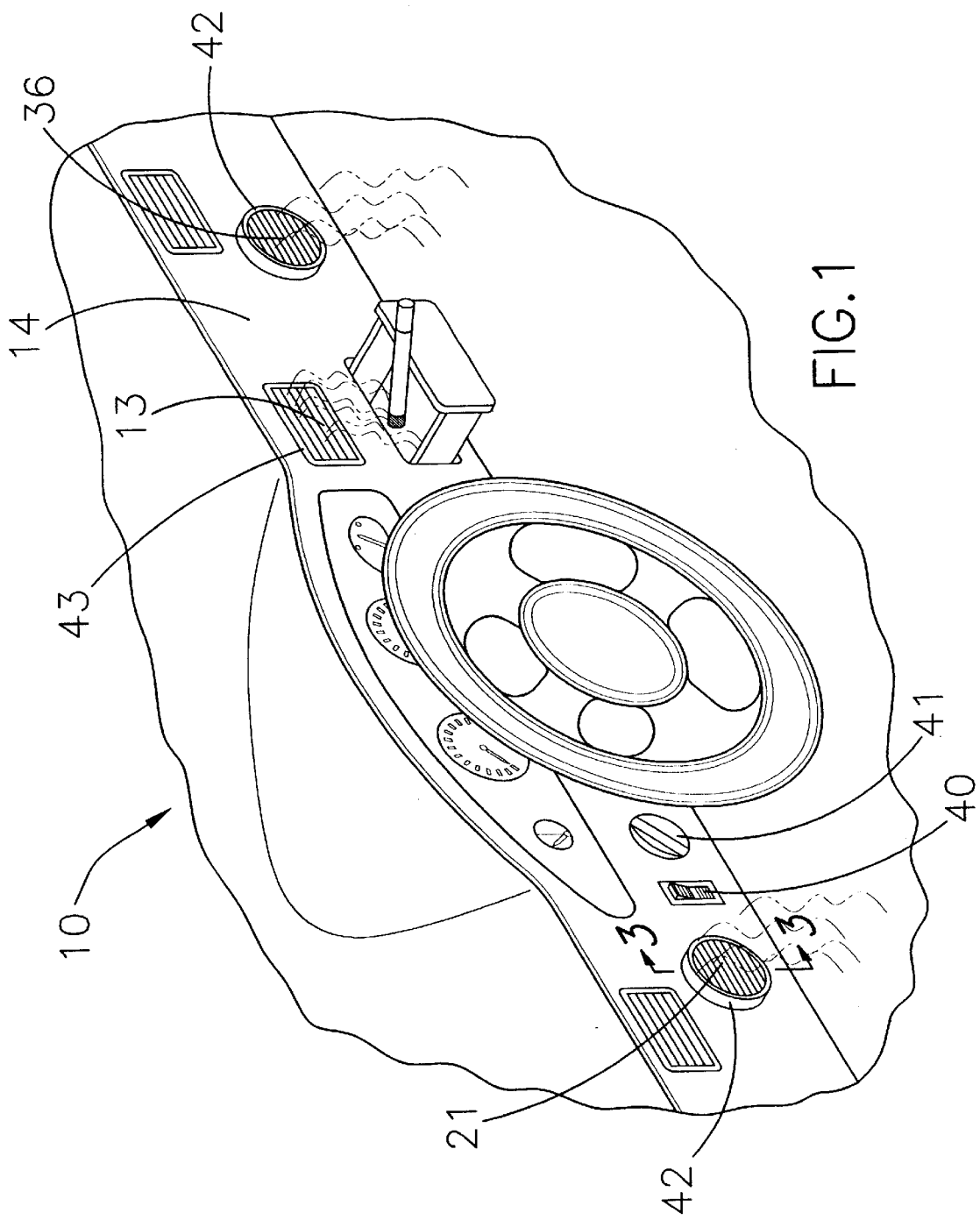
FIG. 1 is a schematic perspective view of a new ventilation apparatus according to the present invention as seen from the interior of the vehicle.
Figure 2:
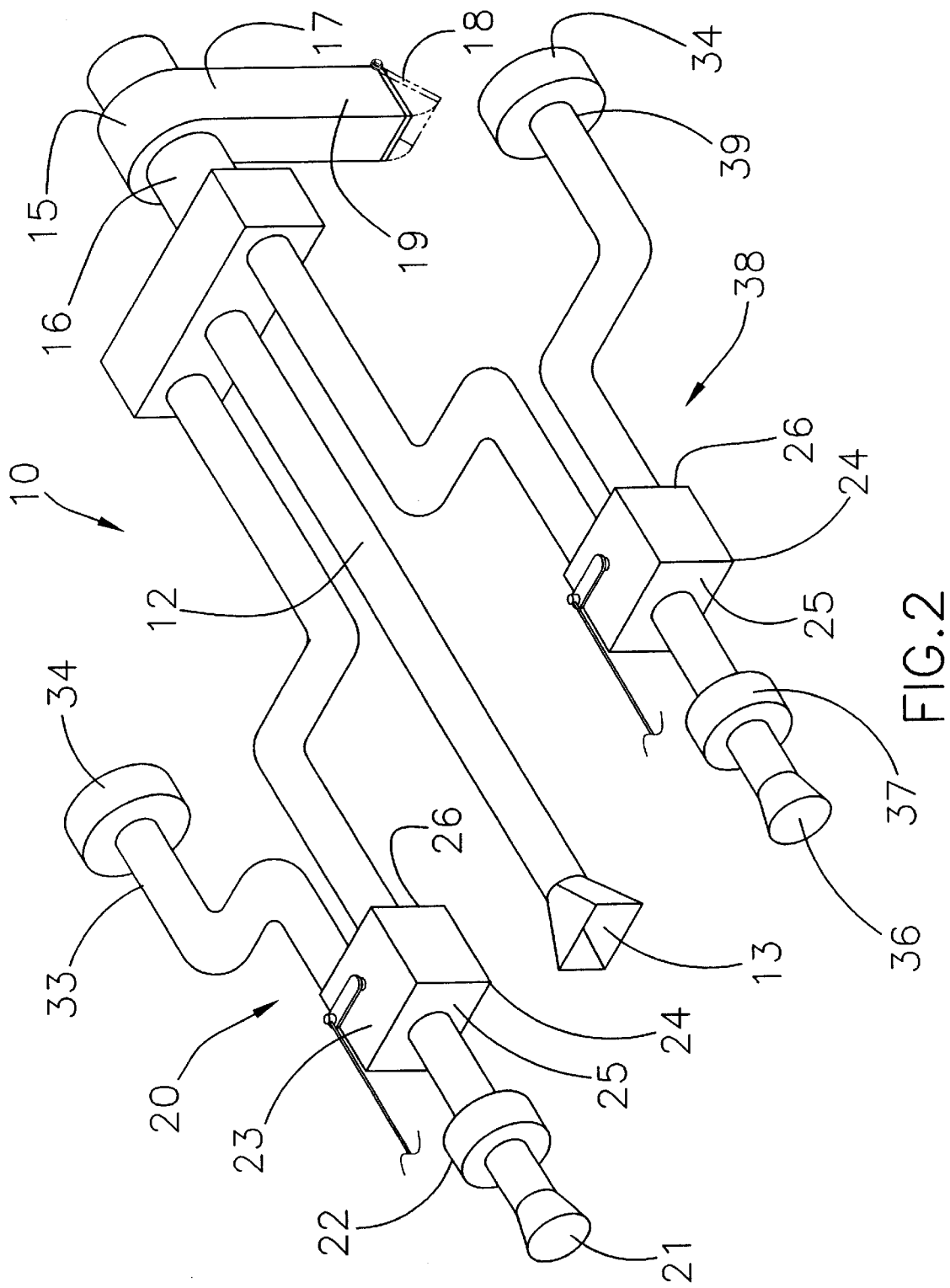
FIG. 2 is a schematic perspective view of the present invention.
Figure 3:
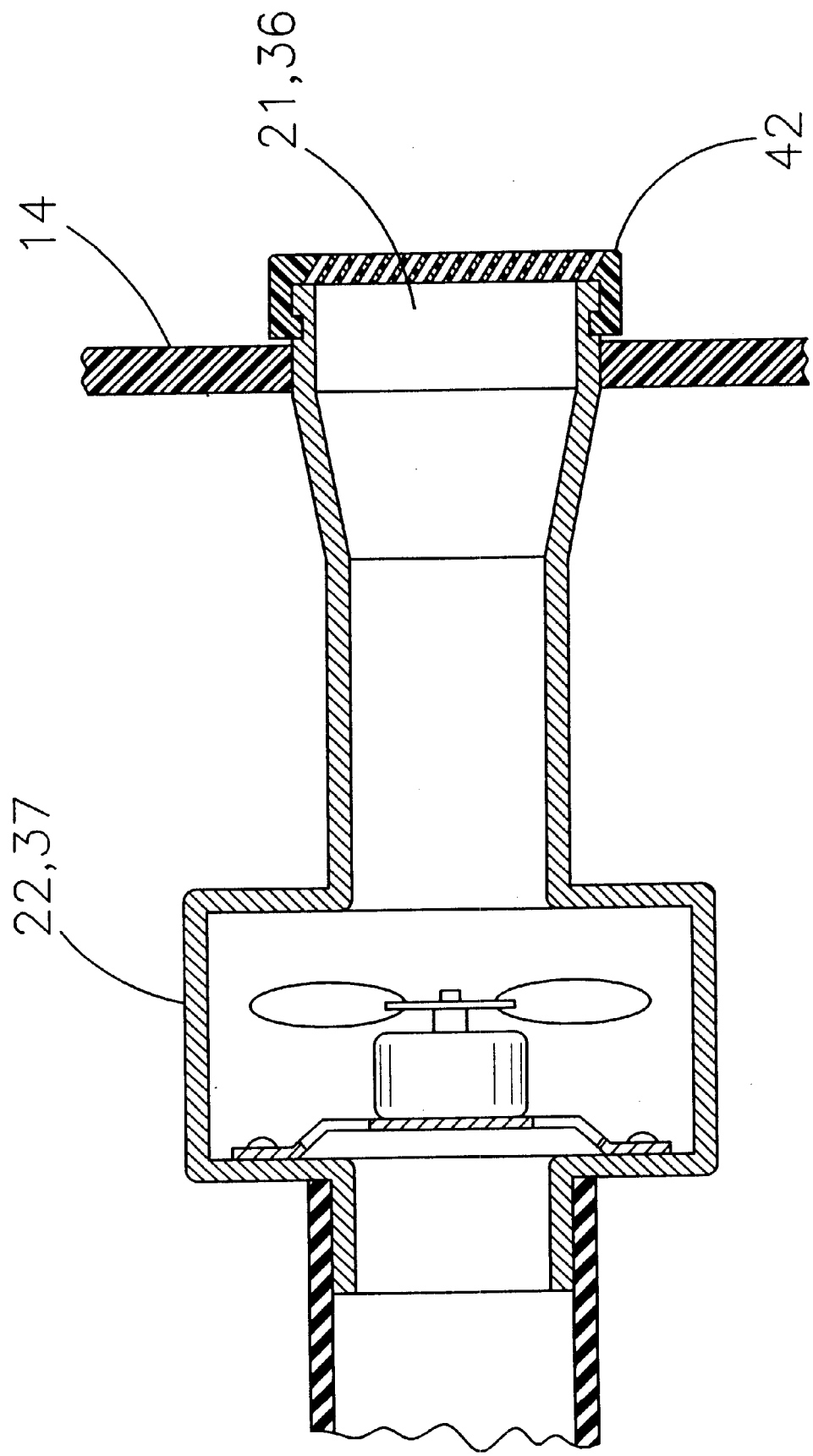
FIG. 3 is a schematic cross-sectional view of a area fan assembly of the present invention.
Figure 4:
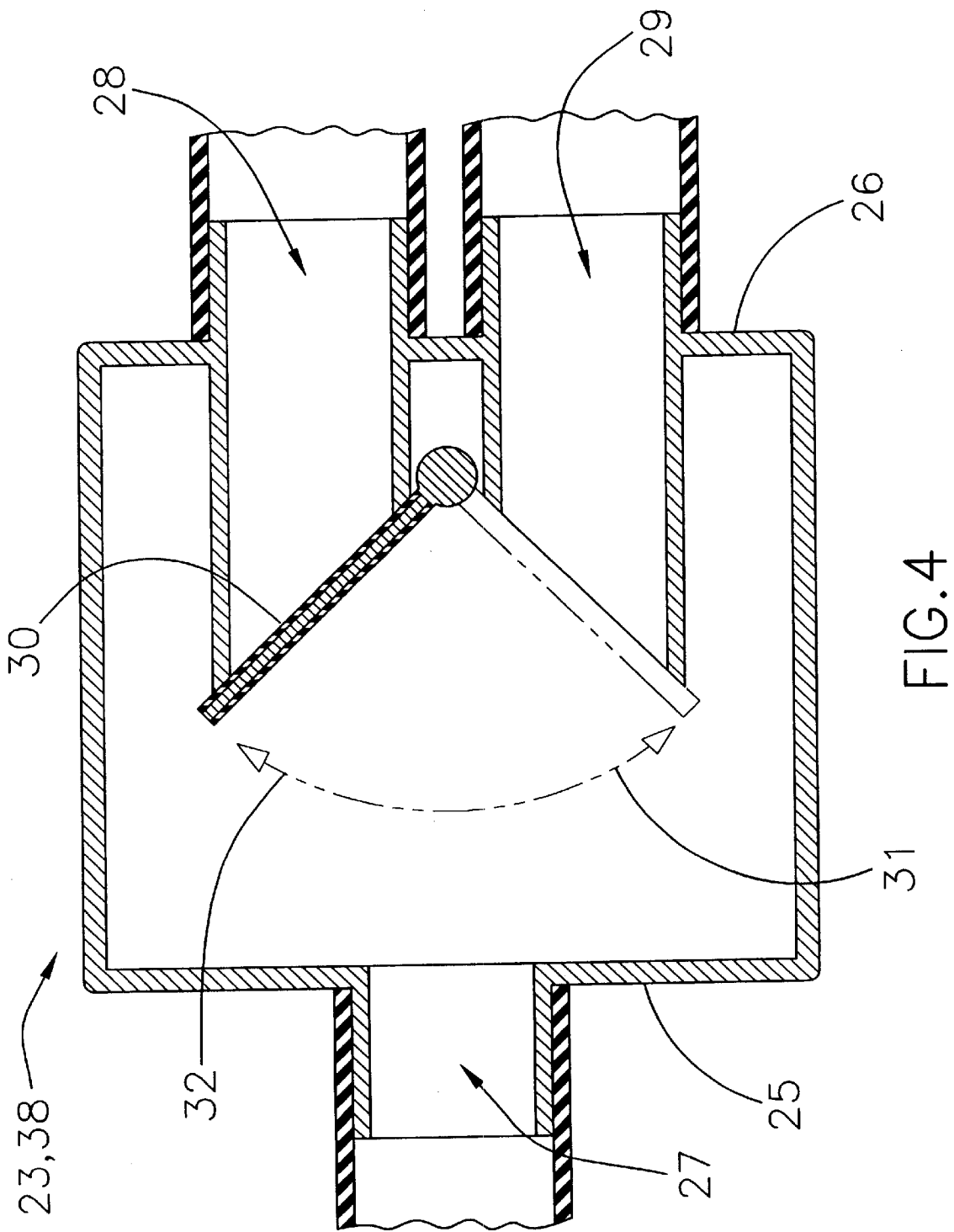
FIG. 4 is a schematic cross-sectional view of a diverting assembly of the present invention.

With reference now to the drawings, and in particular to FIGS. 1 through 4 thereof, a new ventilation apparatus embodying the principles and concepts of the present invention and generally designated by the reference numeral 10 will be described.

As best illustrated in FIGS. 1 through 4, the ventilation apparatus 10 generally comprises a main exhaust system 12 for moving interior air from the interior of the vehicle to an exterior of the vehicle. The main exhaust system 12 comprises:

A main vent 13 for receiving the interior air that is positioned in a dashboard 14 of the vehicle such that the main vent 13 is in fluid communication with the interior of the vehicle.

A main fan assembly 15 for forcing the interior air to the exterior. An intake portion 16 of the main fan assembly 15 is fluidly coupled to the main vent 13. An exhaust portion 17 of the main fan assembly 15 is in fluid communication with the exterior. The exhaust portion 17 includes a restricting member 18 for allowing airflow through to the exterior while restricting airflow from the exterior to the exhaust portion 17. The restricting member 18 is hingably coupled to an end portion 19 of the exhaust portion 17.

Also included is a first area air handling system 20 for moving air between the interior and the exterior of the vehicle. The first area air handling system 20 comprises:

A first area vent 21 that is positioned in the dashboard 14 of the vehicle such that the first area vent 21 is in fluid communication with the interior.

A first area fan assembly 22 for moving air through the first area vent 21 that is in fluid communication with the first area vent 21. The first area fan assembly 22 has a first direction and a second direction.

A first area diverting assembly 23 for directing airflow comprises an enclosure 24 that has a first side 25 and a second side 26. The first side 25 of the enclosure 24 has a fan aperture 27 extending therethrough and is fluidly coupled to the first area fan assembly 22. The second side 26 of the enclosure 24 has an intake aperture 28 and an exhaust aperture 29 extending therethrough. The first area diverting assembly 23 includes a diverting valve 30 for selectively directing airflow through the enclosure 24. The diverting valve 30 is positioned in the enclosure 24 and is located adjacent to the intake aperture 28 and the exhaust aperture 29. The diverting valve 30 is positionable in an intake condition 31 and an exhaust condition 32. The intake condition 31 is characterized by the diverting valve 30 blocking the exhaust aperture 29 such that air is allowed to pass through the intake aperture 28. The exhaust condition 32 is characterized by the diverting valve 30 blocking the intake aperture 28 such that air is allowed to pass through the exhaust aperture 29. The exhaust aperture 29 is fluidly coupled to the main exhaust system 12.

A first area intake member 33 is in fluid communication with the exterior for receiving the exterior air. The first area intake member 33 is fluidly coupled to the intake aperture 28 of the first area diverting assembly 23. The first area intake member 33 includes a filter member 34 for restricting entry of debris into the first area diverting assembly 23.

Also included is a second area air handling system 35 for moving air between the interior and the exterior of the vehicle. The second area air handling system 35 comprises:

A second area vent that is positioned in the dashboard 14 of the vehicle such that the second area vent is in fluid communication with the interior.

A second area fan assembly 37 for moving air through the second area vent is in fluid communication with the second area vent. The second area fan assembly 37 also operates in the first direction and the second direction.

A second area diverting assembly 38 for directing airflow comprises an enclosure 24 that has a first side 25 and a second side 26. The first side 25 of the enclosure 24 has a fan aperture 27 extending therethrough and is fluidly coupled to the second area fan assembly 37. The second side 26 of the enclosure 24 has an intake aperture 28 and exhaust aperture 29 extending therethrough. The second area diverting assembly 38 includes a diverting valve 30 for selectively directing airflow through the enclosure 24. The diverting valve 30 is positioned in the enclosure 24 and is located adjacent to the intake aperture 28 and the exhaust aperture 29. The diverting valve 30 is positionable in an intake condition 31 and an exhaust condition 32. The intake condition 31 is characterized by the diverting valve 30 blocking the exhaust aperture 29 such that air is allowed to pass through the intake aperture 28. The exhaust condition 32 is characterized by the diverting valve 30 blocking the intake aperture 28 such that air is allowed to pass through the exhaust aperture 29. The exhaust aperture 29 is fluidly coupled to the main exhaust system 12.

A second area intake member 39 is in fluid communication with the exterior for receiving the exterior air. The second area intake member 39 is fluidly coupled to the intake aperture 28 of the second area diverting assembly 38. The second area intake member 39 includes a filter member 34 for restricting entry of debris into the second area diverting assembly 38.

The first direction of the first area fan assembly 22 and the second area fan assembly 37 is characterized by the interior air being forced through each of the area air handling systems 12, 20, 35 to the main exhaust system 12. The second direction is characterized by exterior air being forced through each of the area air handling systems 12, 20, 35 to the interior.

A first actuator 40 controls the rate of airflow through the main exhaust system 12, the first area air handling system 20, and the second area air handling system 35. The first actuator 40 is electrically coupled to each of the fan assemblies 15, 22, 37 of each of the systems 12, 20, 35, and to a battery in the vehicle. The first actuator 40 is mounted on the dashboard 14 for positioning in proximity to a user, and comprises an electrical switch.

A second actuator 41 switches between different modes of operation. The second actuator 41 is electrically coupled to each of the fan assemblies 15, 22, 37 of each of the systems 12, 20, 35 and the first actuator 40. The second actuator 41 is operationally coupled to each of the diverting valves 30 of the first area air handling system 20 and the second area air handling system 35. The second actuator 41 is mounted on the dashboard 14 and positioned in proximity to a user, and comprises an electromechanical switch.

The different modes of operation include a complete air exhaust mode, a first area exhaust mode, and a second area exhaust mode. Each of the modes is operational only when the first actuator 40 provides power to the second actuator 41.

The total air exhaust mode is characterized by each of the diverting valves 30 being in the exhaust condition 32 while the first area fan assembly 22 and second area fan assembly 37 are both operating in the first direction, and the main fan assembly 15 operating.

The first area exhaust mode is characterized by the first area diverting valve 30 being in the exhaust condition 32 while the first area fan assembly 22 is operating in the first direction, the second area diverting valve 30 being in the intake condition 31 while the second area fan assembly 37 is operating in the second direction, and the main fan assembly 15 operating.

The second area exhaust mode is characterized by the second area diverting valve 30 being in the exhaust condition 32 while the second area fan assembly 37 is operating in the first direction, the first area diverting valve 30 being in the intake condition 31 while the first area fan assembly 22 is operating in the second direction, and the main fan assembly 15 operating.

A plurality of louvered area vent covers 42 re-direct airflow through each of the area vents 21, 36. One each of the area vent covers 42 is rotatably coupled to each of the area vents 21, 36.

A louvered main vent cover 43 covers the main vent 13 and is mounted on the main vent 13.

In use, the preferred embodiment would have the main exhaust vent positioned next to the ashtray to remove smoke and odors. One each of the area system vents would be positioned on either side of the dashboard so that fresh air would divert smoke away from one area while the smoke would be pulled out through the vent on the other side. The user may reverse the condition, or set it so all vents pull air out.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A ventilation apparatus for selectively moving interior air of an interior of a motor vehicle, said apparatus comprising:

a main exhaust system for moving interior air from the interior of the vehicle to an exterior of the vehicle;

a first area air handling system for moving air between the interior and the exterior of the vehicle;

a second area air handling system for moving air between the interior and the exterior of the vehicle;

a first actuator for controlling a rate of airflow through said main exhaust system, said first area air handling system, and said second area air handling system;

a second actuator for switching between a plurality of modes of operation; and wherein said plurality of modes of operation includes a complete air exhaust mode, a first area exhaust mode, and a second area exhaust mode, each of said modes being operational only when said first actuator provides power to said second actuator.

2. The ventilation apparatus as set forth in claim 1, said main exhaust system comprising a main vent for receiving the interior air, said main vent being positioned in a dashboard of the vehicle such that said main vent is in fluid communication to the interior of the vehicle.

3. The ventilation apparatus as set forth in claim 2, said main exhaust system comprising a main fan assembly for forcing the interior air to the exterior, an intake portion of said main fan assembly being fluidly coupled to said main vent, an exhaust portion of said main fan assembly being in fluid communication with the exterior, said exhaust portion including a restricting member for allowing airflow through to the exterior while restricting airflow from the exterior to said exhaust portion, said restricting member being hingably coupled to an end portion of said exhaust portion.

4. The ventilation apparatus as set forth in claim 1, said first area air handling system comprising a first area vent being positioned in the dashboard of the vehicle such that said first area vent is in fluid communication with the interior.

5. The ventilation apparatus as set forth in claim 4, said first area air handling system comprising a first area fan assembly for moving air through said first area vent, said first area fan assembly being in fluid communication with said first area vent, said first area fan assembly having a first direction and a second direction.

6. The ventilation apparatus as set forth in claim 5, said first area air handling system further comprising a first area diverting assembly for directing airflow, said first area diverting assembly comprising an enclosure having a first side and a second side, said first side of said enclosure having a fan aperture extending therethrough and being fluidly coupled to said first area fan, said second side of said enclosure having an intake aperture and an exhaust aperture extending therethrough, said exhaust aperture being fluidly coupled to said main exhaust system, said first area diverting assembly including a diverting valve for selectively directing airflow through said enclosure, said diverting valve being positioned in said enclosure and being located adjacent to said intake aperture and said exhaust aperture, said diverting valve being positionable in an intake condition and an exhaust condition.

7. The ventilation apparatus as set forth in claim 6, said first area air handling system further comprising wherein said intake condition is characterized by said diverting valve blocking said exhaust aperture such that air is allowed to pass through said intake aperture, and said exhaust condition is characterized by said diverting valve blocking said intake aperture such that air is allowed to pass through said exhaust aperture.

8. The ventilation apparatus as set forth in claim 6, said first area air handling system further comprising a first area intake member being in fluid communication with the exterior for receiving the exterior air, said first area intake member being fluidly coupled to said intake aperture of said first area diverting assembly, said first area intake member including a filter member for restricting entry of debris into said first area diverting assembly.

9. The ventilation apparatus as set forth in claim 1, said second area air system further comprising a second area vent being positioned in the dashboard of the vehicle such that said second area vent is in fluid communication with the interior.

10. The ventilation apparatus as set forth in claim 9, said second area air system further comprising a second area fan assembly for moving air through said second area vent, said second area fan assembly being in fluid communication with said second area vent, said second area fan assembly having a first direction and a second direction.

11. The ventilation apparatus as set forth in claim 10, said second area air system further comprising a second area diverting assembly for directing airflow, said second area diverting assembly comprising an enclosure having a first side and a second side, said first side of said enclosure having a fan aperture extending therethrough and being fluidly coupled to said second area fan, said second side of said enclosure having an intake aperture and exhaust aperture extending therethrough, said exhaust aperture being fluidly coupled to said main exhaust system, said second area diverting assembly including a diverting valve for selectively directing airflow through said enclosure, said diverting valve being positioned in said enclosure and being located adjacent to said intake aperture and said exhaust aperture, said diverting valve being positionable in an intake condition and an exhaust condition.

12. The ventilation apparatus as set forth in claim 11, wherein said intake condition is characterized by said diverting valve blocking said exhaust aperture such that air is allowed to pass through said intake aperture, and said exhaust condition is characterized by said diverting valve blocking said intake aperture such that air is allowed to pass through said exhaust aperture.

13. The ventilation apparatus as set forth in claim 11, said second area air system further comprising a second area intake member being in fluid communication with the exterior for receiving the exterior air, said second area intake member being fluidly coupled to said intake aperture of said second area diverting assembly, said second area intake member including a filter member for restricting entry of debris into said second area diverting assembly.

14. The ventilation apparatus as set forth in claims 5 and 10, wherein said first direction of said first area fan assembly and said second area fan assembly is characterized by the interior air being forced through each of said area air handling systems to said main exhaust system, and said second direction is characterized by exterior air being forced through each of said area air handling systems to the interior.

15. The ventilation apparatus as set forth in claim 1, further comprising said first actuator being electrically coupled to fan assemblies of each of said systems, said first actuator being electrically coupled to a battery in the vehicle, said first actuator being mounted on a dashboard for positioning in proximity to a user, said first actuator comprising an electrical switch.

16. The ventilation apparatus as set forth in claim 1, further comprising said second actuator being electrically coupled to fan assemblies of each of said systems and said first actuator, said second actuator being operationally coupled to diverting valves of said area air handling systems, said second actuator being mounted on a dashboard and positioned in proximity to a user, said second actuator comprising an electromechanical switch.

17. The ventilation apparatus as set forth in claim 1, wherein said total air exhaust mode is characterized by diverting valves of each of said area air handling systems being in an exhaust condition while a first area fan assembly and a second area fan assembly are both operating in a first direction, and a main fan assembly is operating;

wherein said first area exhaust mode is characterized by a first area diverting valve being in said exhaust condition while said first area fan assembly is operating in said first direction, a second area diverting valve is in an intake condition while said second area fan assembly is operating in a second direction, and said main fan assembly is operating; and wherein said second area exhaust mode is characterized by said second area diverting valve being in said exhaust condition while said second area fan assembly is operating in said first direction, said first area diverting valve is in said intake condition while said first area fan assembly is operating in said second direction, and said main fan assembly is operating.

18. The ventilation apparatus as set forth in claim 1, further comprising a plurality of louvered area vent covers for re-directing airflow through each of an area vent, one each of said area vent covers being rotatably coupled to each of said area vents; and a louvered main vent cover for covering a main vent being mounted on said main vent.

19. A ventilation apparatus for selectively moving air of an interior of a motor vehicle, said apparatus comprising:

a main exhaust system for moving interior air from the interior of the vehicle to an exterior of the vehicle, said main exhaust system comprising:

a main vent for receiving the interior air, said main vent being positioned in a dashboard of the vehicle such that said main vent is in fluid communication to the interior of the vehicle;

a main fan assembly for forcing the interior air to the exterior, an intake portion of said main fan assembly being fluidly coupled to said main vent, an exhaust portion of said main fan assembly being in fluid communication with the exterior, said exhaust portion including a restricting member for allowing airflow through to the exterior while restricting airflow from the exterior to said exhaust portion, said restricting member being hingably coupled to an end portion of said exhaust portion;

a first area air handling system for moving air between the interior and the exterior of the vehicle, said first area air handling system comprising:

a first area vent being positioned in the dashboard of the vehicle such that said first area vent is in fluid communication with the interior;

a first area fan assembly for moving air through said first area vent, said first area fan assembly being in fluid communication with said first area vent, said first area fan assembly having a first direction and a second direction;

a first area diverting assembly for directing airflow, said first area diverting assembly comprising an enclosure having a first side and a second side, said first side of said enclosure having a fan aperture extending therethrough and being fluidly coupled to said first area fan, said second side of said enclosure having an intake aperture and an exhaust aperture extending therethrough, said first area diverting assembly including a diverting valve for selectively directing airflow through said enclosure, said diverting valve being positioned in said enclosure and being located adjacent to said intake aperture and said exhaust aperture, said diverting valve being positionable in an intake condition and an exhaust condition, wherein said intake condition is characterized by said diverting valve blocking said exhaust aperture such that air is allowed to pass through said intake aperture, and said exhaust condition is characterized by said diverting valve blocking said intake aperture such that air is allowed to pass through said exhaust aperture, said exhaust aperture being fluidly coupled to said main exhaust system;

a first area intake member being in fluid communication with the exterior for receiving the exterior air, said first area intake member being fluidly coupled to said intake aperture of said first area diverting assembly, said first area intake member including a filter member for restricting entry of debris into said first area diverting assembly;

a second area air handling system for moving air between the interior and the exterior of the vehicle, said second area air handling system comprising:

a second area vent being positioned in the dashboard of the vehicle such that said second area vent is in fluid communication with the interior;

a second area fan assembly for moving air through said second area vent, said second area fan assembly being in fluid communication with said second area vent, said second area fan assembly having said first direction and said second direction;

a second area diverting assembly for directing airflow, said second area diverting assembly comprising an enclosure having a first side and a second side, said first side of said enclosure having a fan aperture extending therethrough and being fluidly coupled to said second area fan, said second side of said enclosure having an intake aperture and exhaust aperture extending therethrough, said second area diverting assembly including a diverting valve for selectively directing airflow through said enclosure, said diverting valve being positioned in said enclosure and being located adjacent to said intake aperture and said exhaust aperture, said diverting valve being positionable in an intake condition and an exhaust condition, wherein said intake condition is characterized by said diverting valve blocking said exhaust aperture such that air is allowed to pass through said intake aperture, and said exhaust condition is characterized by said diverting valve blocking said intake aperture such that air is allowed to pass through said exhaust aperture, said exhaust aperture being fluidly coupled to said main exhaust system;

a second area intake member being in fluid communication with the exterior for receiving the exterior air, said second area intake member being fluidly coupled to said intake aperture of said second area diverting assembly, said second area intake member including a filter member for restricting entry of debris into said second area diverting assembly;

wherein said first direction of said first area fan assembly and said second area fan assembly is characterized by the interior air being forced through each of said area air handling systems to said main exhaust system, and said second direction is characterized by exterior air being forced through each of said area air handling systems to the interior;

a first actuator for controlling a rate of airflow through said main exhaust system, said first area air handling system, and said second area air handling system, said first actuator being electrically coupled to each of said fan assemblies of each of said systems, said first actuator being electrically coupled to a battery in the vehicle, said first actuator being mounted on the dashboard for positioning in proximity to a user, said first actuator comprising an electrical switch;

a second actuator for switching between a plurality of modes of operation, said second actuator being electrically coupled to each of said fan assemblies of each of said systems and said first actuator, said second actuator being operationally coupled to each of said diverting valves of said first area air handling system and said second area air handling system, said second actuator being mounted on the dashboard and positioned in proximity to a user, said second actuator comprising an electromechanical switch;

wherein said plurality of modes of operation includes a complete air exhaust mode, a first area exhaust mode, and a second area exhaust mode, each of said modes being operational only when said first actuator provides power to said second actuator;

wherein said total air exhaust mode is characterized by each of said diverting valves being in said exhaust condition while said first area fan assembly and second area fan assembly are both operating in said first direction, and said main fan assembly is operating;

wherein said first area exhaust mode is characterized by said first area diverting valve being in said exhaust condition while said first area fan assembly is operating in said first direction, said second area diverting valve is in said intake condition while said second area fan assembly is operating in said second direction, and said main fan assembly is operating;

wherein said second area exhaust mode is characterized by said second area diverting valve being in said exhaust condition while said second area fan assembly is operating in said first direction, said first area diverting valve is in said intake condition while said first area fan assembly is operating in said second direction, and said main fan assembly is operating; and a plurality of louvered area vent covers for re-directing airflow through each of said area vents, one each of said area vent covers being rotatably coupled to each of said area vents;

a louvered main vent cover for covering said main vent being mounted on said main vent.

20. A ventilation apparatus for selectively moving interior air of an interior of a motor vehicle, said apparatus comprising:

a main exhaust system for moving interior air from the interior of the vehicle to an exterior of the vehicle;

a first area air handling system for moving air between the interior and the exterior of the vehicle;

a second area air handling system for moving air between the interior and the exterior of the vehicle;

a first actuator for controlling a rate of airflow through said main exhaust system, said first area air handling system, and said second area air handling system;

a second actuator for switching between a plurality of modes of operation;

said main exhaust system comprising a main vent for receiving the interior air, said main vent being positioned in a dashboard of the vehicle such that said main vent is in fluid communication to the interior of the vehicle;

said main exhaust system comprising a main fan assembly for forcing the interior air to the exterior, an intake portion of said main fan assembly being fluidly coupled to said main vent, an exhaust portion of said main fan assembly being in fluid communication with the exterior, said exhaust portion including a restricting member for allowing airflow through to the exterior while restricting airflow from the exterior to said exhaust portion, said restricting member being hingably coupled to an end portion of said exhaust portion.

* * * * *